(12) United States Patent
Busch et al.

(10) Patent No.: US 7,237,325 B2
(45) Date of Patent: Jul. 3, 2007

(54) HANDLING AND ACTUATION APPARATUS

(75) Inventors: Achim Busch, Alzey (DE); Frank Geisenheiner, Wiesbaden (DE); Edgar Maehringer-Kunz, Muenster-Sarmasheim (DE); Ines Mattern, Mainz (DE); Norbert Jakob, Albig (DE)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 10/886,305

(22) Filed: Jul. 7, 2004

(65) Prior Publication Data

US 2005/0044683 A1 Mar. 3, 2005

(30) Foreign Application Priority Data

Aug. 27, 2003 (EP) .................................. 03102661

(51) Int. Cl.
*B23P 19/00* (2006.01)
(52) U.S. Cl. .......................................... 29/700; 29/252
(58) Field of Classification Search ............... 29/426.1, 29/426.3, 426.5, 798, 809, 813, 700, 240, 29/812, 252; 227/48, 110; 221/211; 269/21
See application file for complete search history.

(56) References Cited

U.S. PATENT DOCUMENTS

| 3,656,520 | A | * | 4/1972 | Caffa ............................ 81/430 |
| 6,202,292 | B1 | * | 3/2001 | Farnworth et al. ............ 29/743 |
| 6,941,627 | B2 | * | 9/2005 | Fritsche et al. ........... 29/243.53 |

* cited by examiner

*Primary Examiner*—Jermie E. Cozart
(74) *Attorney, Agent, or Firm*—Zilka-Kotab, PC

(57) ABSTRACT

A handling and actuation apparatus particularly adapted for clean room applications includes an actuation section for mounting a machine element to a work piece. The actuation section comprises a movable actuation member. A feeding section for feeding the aforementioned machine element to the actuation section is provided. An inner debris suction section is positioned in the vicinity of the actuation section, the inner debris suction section sucking air from the vicinity of the actuation member. An outer debris and air suction section is positioned in the vicinity of the feeding section sucks air from the vicinity of machine element during feeding of the machine element.

27 Claims, 3 Drawing Sheets

HANDLING AND ACTUATION APPARATUS

FIELD OF THE INVENTION

The present invention relates to object handling devices, and more particularly, this invention relates to a feeder and a handling and actuation apparatus such as an automated screw feeder system adapted for clean room applications.

BACKGROUND OF THE INVENTION

Clean rooms, by their nature, must remain clean and free from debris and other contaminants. When constructing precision devices, such as hard disk drives (HDDs) for example, even trace amounts of contaminants can have serious consequences including malfunction, misreads, and even total device failure.

Screwing processes being performed in clean rooms underlie special conditions with respect to quality. However, the known screw feeder systems are insofar problematic. One problem replete with such systems is that when attaching elements to a work piece, debris from the element being attached can contaminate the device being assembled. Such debris is often found attached to the element as a parasitic contaminant (e.g., dust, metal filings, etc.), but may also be created by the actuation process, such as filings created during tapping of a screw.

Further, when an element is found to be incorrectly placed or coupled, prior art systems often require the system to be stopped and the element manually removed or adjusted. The loss of productivity and potential for contamination are apparent.

Therefore, what is needed is a handling and actuation apparatus that reduces the likelihood of contamination. What is further needed is a handling and actuation apparatus that avoids the lost productivity and potential for contamination due to removal of defective, mispositioned or miscoupled elements.

SUMMARY OF THE INVENTION

The present invention has been made in view of the above-stated circumstances. It is, therefore, an object of the present invention to provide a handling and actuation apparatus particularly adapted for use in clean rooms and capable of improving the work result.

According to one aspect of the invention, there is provided an actuation section for mounting a machine element to a work piece via a movable actuation member. A feeding section for feeding the aforementioned machine element to the actuation section is provided. An inner debris suction section is positioned in the vicinity of the actuation section, the inner debris suction section sucking air from the vicinity of the actuation member at least during operation of the actuation member to remove contaminants both from the machine element as well as debris created during actuation and mounting of the machine element. An outer debris and air suction section positioned in the vicinity of the feeding section sucks air from the vicinity of the machine element during feeding of the machine element through the feeding section to the actuation section.

According to one embodiment of the handling and actuation apparatus, a shield or shutter in combination with a suction or exhaustion device, preferably an exhaustion tube, may be used to exhaust or to suck off contaminated air during mounting the machine element. The suction or exhaustion device is operated in a manner that contamination will be removed in a very efficient way.

A further benefit that can be provided by the present invention is that the actuation section can be suitable for dismounting a machine element mounted to the work piece. It is then possible to verify the result of the mounting process, whereby in the case of detecting an insufficient result of the mounting process, the step of immediately dismounting the machine element may be provided. During the dismounting step, air is sucked from the vicinity of the machine element while at least partially moving the machine element during the dismounting step. The step of sucking air from the vicinity of the machine element during the dismounting process may preferably include sucking the dismounted machine element away from the work piece. This provides a cost-efficient and clean mounting process which results in high quality work pieces. Thus, it is no longer necessary to track bad work pieces during the production process in order to be able to repair and adjust them manually at a later production step.

In one embodiment, the movable actuation member comprises a screw driver blade, and the actuation section comprises a rotation mechanism for rotating the screw driver blade and a relocation mechanism for displacing the screw driver blade along its longitudinal axis. Such a combination of an actuation member and an actuation section provides safe and quick mounting operations of screw-type machine elements.

If the relocation mechanism further comprises a guide tube being positionable along the longitudinal axis of the screw driver then it is easy to separate a screw away from the screw driver blade by simply retracting the screw driver blade back into the guide tube. The screw is then peeled away from the screw driver blade upon impinging on the edge of the leading opening of the guide tube. This effect can be obtained or supported by a radial peeling spring provided in the vicinity of the screw driver blade.

It is preferable that the inner debris suction section comprise a moveable shield member surrounding the actuation member at least during operation of the actuation member, and a suction tube being connected to the shield member. Such a shield member facilitates maintaining a sufficient level of low pressure around the machine element during the whole mounting process. A good air and particle suction result is thereby obtained. It is preferred that the cross-section of the shield member and of the suction tube provide a passage for a dismounted machine element. This facilitates sucking air from the vicinity of the machine element during the dismounting process and, at the same time, sucking the dismounted machine element away from the work piece.

According to yet another aspect of the present invention, there is provided a handling and actuation apparatus in which the outer debris and air suction section is positioned towards a clamping position of the machine element in the feeding section. Such a design permits providing at least one cleaning step before mounting the machine element to the work piece. This improves the cleanness of the environment at a later mounting step of the machine element. Starting from such a design, it is preferable that the feeding section comprises a movable feeding tube being connected to a machine element conveyor. The machine element conveyor may then comprise a dispensing magazine, or a vibratory unit for singling out one machine element, and an air pressure feeder for transporting the machine element to the clamping section.

By combining the air pressure feeder with the outer debris and air suction section at an intermediate clamping position of the machine element in the feeding section, a safe, clean and faultless supply of machine elements is made possible. The moving air surrounding the machine element during the transport from a stack or from a reservoir to the intermediate clamping position removes loose particles from its surface. These particles do not need to be removed at a later mounting step of the machine element.

Cleanliness of the mounting process may be further improved by arranging a shutter between the feeding section and the actuation section. In a closed position, the shutter prevents passage of air from the feeding section to the actuation section. In an open position, such passage of air and passage of the machine element and the movable actuation of the actuation section is made possible. Such a shutter prevents moving and possibly dirty air transporting the machine element to the intermediate clamping position from entering into inner sections of the clean room.

According to yet another aspect of the present invention, a clean room is provided for mounting at least one machine element to at least one work piece provided with one or more handling and actuation systems comprising one or more of the aforementioned features of the invention.

The invention also includes a use of such a clean room for manufacturing work pieces, e.g. for manufacturing hard disk drives usable in computers or for medicine technology equipment. It is emphasized that the proposed feeder can even be used outside the field of screw feeding. The invention applies to all environments where mechanical parts or machine elements as screws, bolts or other means for fastening at least two mechanical parts together have to be fed to a particular position under clean conditions.

Thus, the embodiments described herein are very effective at reducing contamination typical of pneumatically controlled feeders of mechanical parts, especially for screw feeders. For instance, particles created by tapping screws are removed before they can enter the clean room. Because any emitted particles are captured, they do not impair the clean room conditions and the consequent work result. The quality of the screwing process is thus improved.

A complete screwing cycle can advantageously be performed with one single apparatus under clean room conditions. Such a screwing cycle may comprise the sub-processes of feeding the screw, screwing the screw into the work piece, removing the screw, reworking the screw thread, and retracting the screw driver blade.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings. These drawings, which are incorporated in and constitute a part of the specification, illustrate presently preferred embodiments of the invention, and together with the general description given above and the detailed description of the preferred embodiments given below, serve to explain the principles of the invention.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
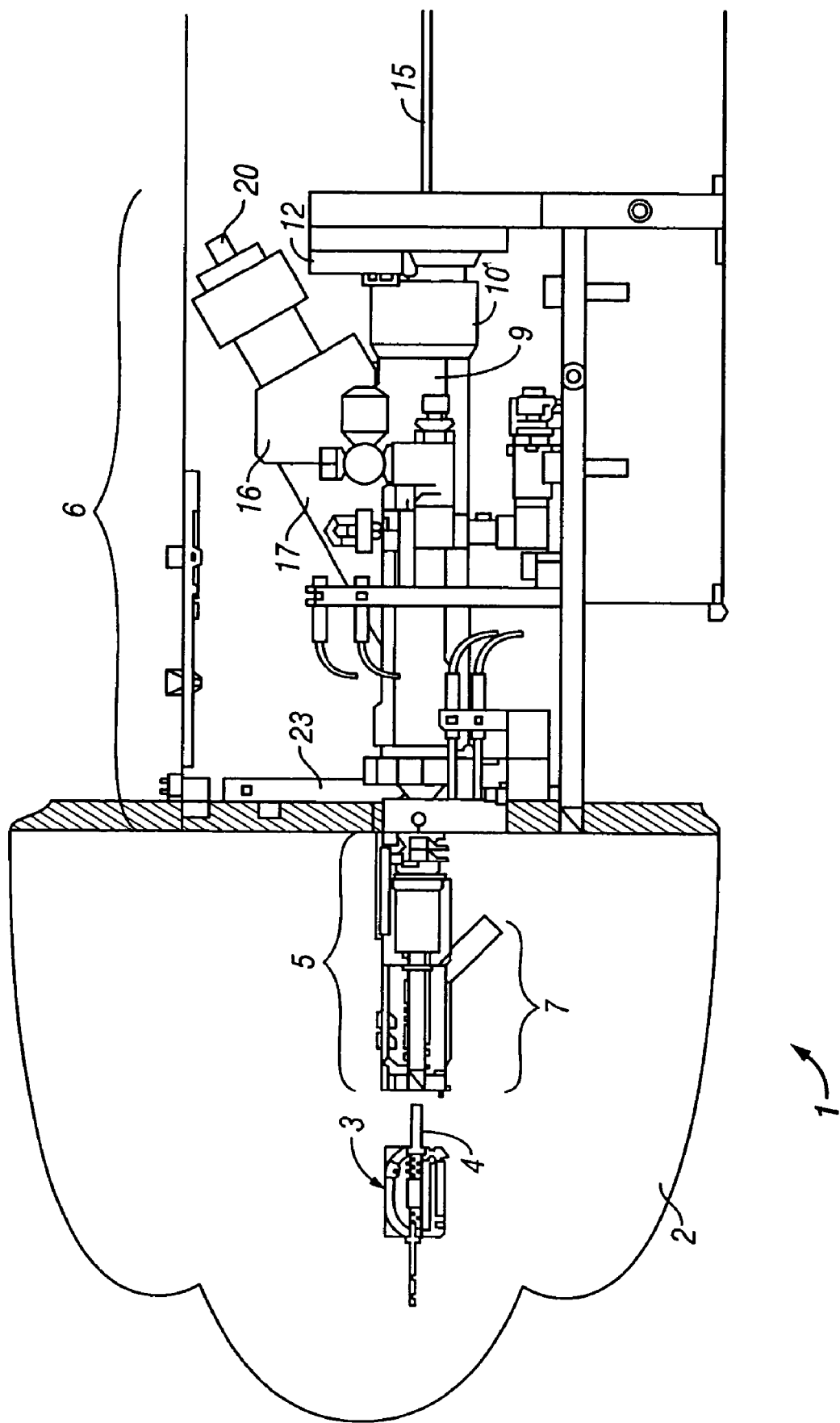
FIG. 1 is a side view of a handling and actuation system according to one embodiment.
Figure 2:
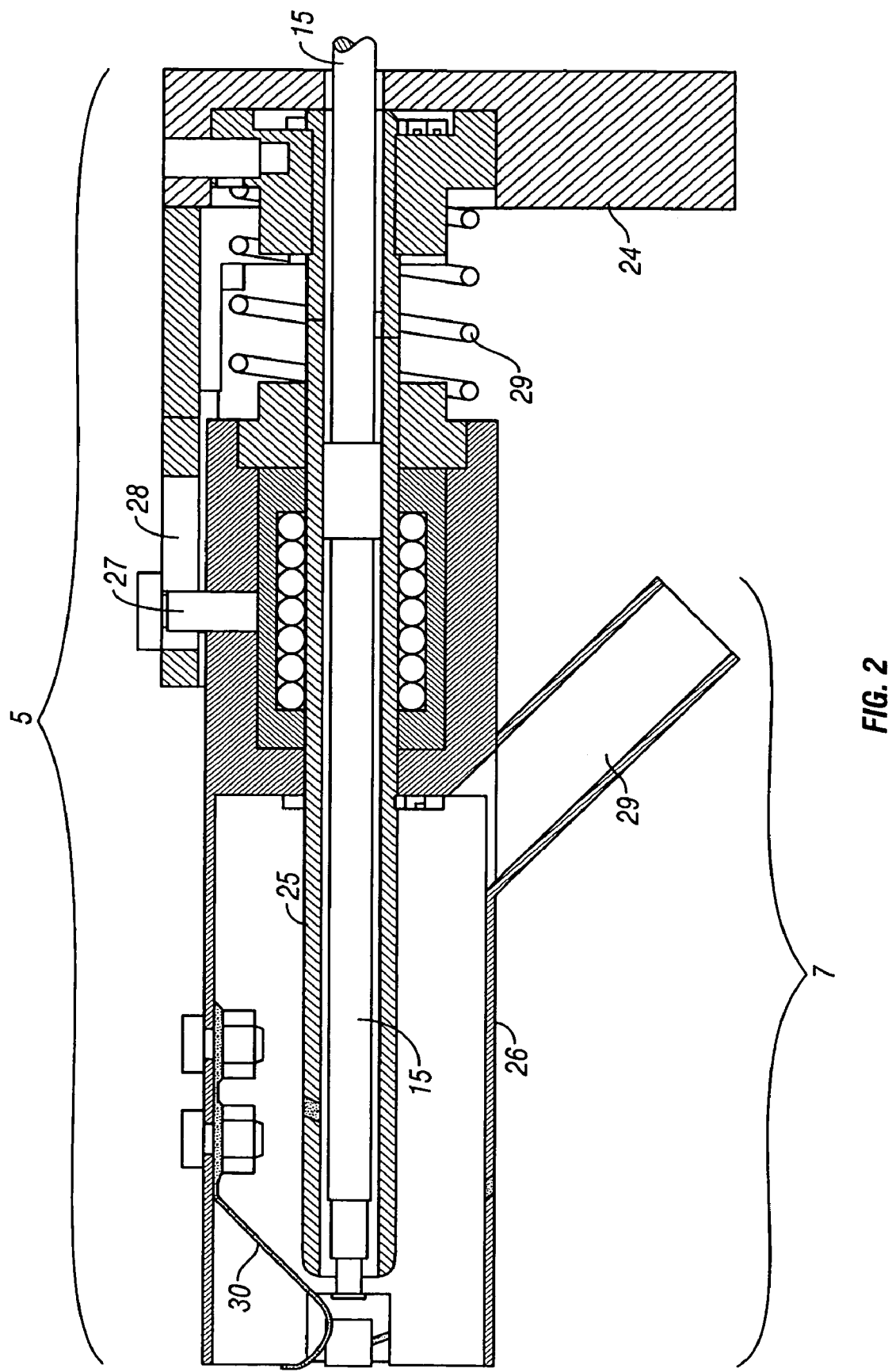
FIG. 2 is a partial cross sectional side view of an actuation section of the handling and actuation system of FIG. 1.
Figure 3:
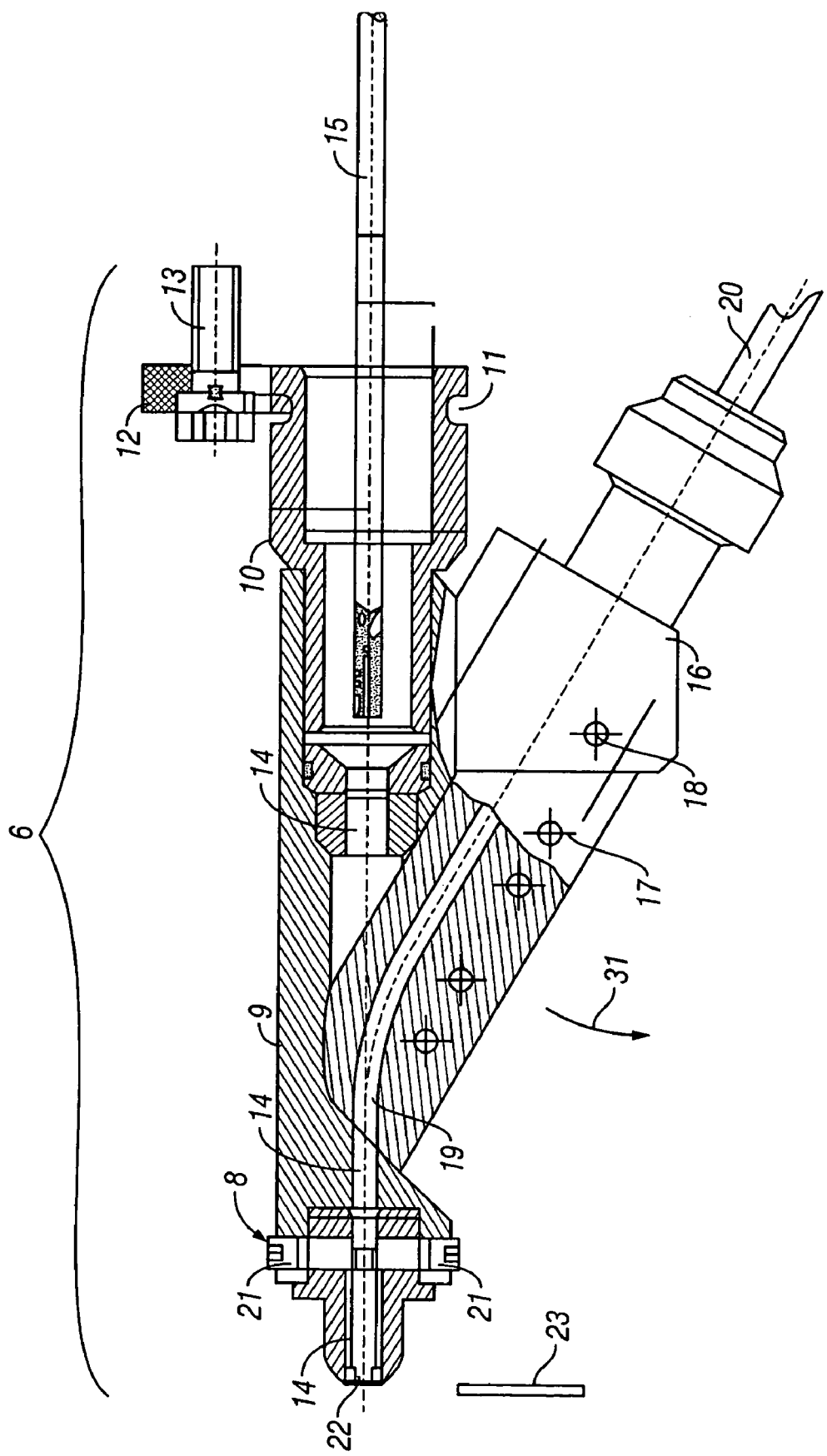
FIG. 3 is partial cross sectional view of a feeding section of the handling and actuation system according to FIG. 1.

FIGS. 1 to 3 show a preferred embodiment of the present invention, and are described in detail below. First, however, the general precepts of the present invention will be described generally in relation to FIGS. 1 to 3.

According to one aspect of the invention, there is provided an actuation section 5 for mounting a machine element 4, e.g., a screw, rivet, circuit device, cover plate, bracket, etc., to a work piece 3 via a movable actuation member 15, e.g. a flat head screw driver blade for slotted screws, a Philips-type screw driver blade, a TORX screw driver blade, pincer, socket, etc. A feeding section 6 for feeding the aforementioned machine element 4 to the actuation section 5 is provided. An inner debris suction section 7 is positioned in the vicinity of the actuation section 5, the inner debris suction section 7 sucking air from the vicinity of the actuation member 15 at least during operation of the actuation member 15 to remove contaminants both from the machine element 4 as well as debris created during actuation and mounting of the machine element 4. An outer debris and air suction section 8 positioned in the vicinity of the feeding section 6 sucks air from the vicinity of the machine element 4 during feeding of the machine element 4 through the feeding section 6 to the actuation section 5.

According to one embodiment of the handling and actuation apparatus, a shield or shutter 23 in combination with a suction or exhaustion device, preferably a suction or exhaust tube, may be used to exhaust or to suck off contaminated air during mounting the machine element 4. The suction or exhaustion device is operated in a manner that contamination will be removed in a very efficient way.

A further benefit that can be provided by the present invention is that the actuation section 5 can be suitable for dismounting a machine element 4 mounted to the work piece 3. It is then possible to verify the result of the mounting process, whereby in the case of detecting an insufficient result of the mounting process, the step of immediately dismounting the machine element 4 may be provided. During the dismounting step, air is sucked from the vicinity of the machine element 4 while at least partially moving the machine element 4 during the dismounting step. The step of sucking air from the vicinity of the machine element 4 during the dismounting process may preferably include sucking the dismounted machine element 4 away from the work piece 3. This provides a cost-efficient and clean mounting process which results in high quality work pieces 3. Thus, it is no longer necessary to track bad work pieces 3 during the production process in order to be able to repair and adjust them manually at a later production step.

In one embodiment, the movable actuation member 15 comprises a screw driver blade, and the actuation section 5 comprises a rotation mechanism, e.g., electric motor, (not shown) for rotating the screw driver blade and a relocation mechanism for displacing the screw driver blade along its longitudinal axis. Such a combination of an actuation member 15 and an actuation section 5 provides safe and quick mounting operations of screw-type machine elements 4.

If the relocation mechanism further comprises a guide tube 25 being positionable along the longitudinal axis of the screw driver then it is easy to separate a screw away from the screw driver blade by simply retracting the screw driver blade back into the guide tube 25. The screw is then peeled away from the screw driver blade upon impinging on the edge of the leading opening of the guide tube 25. This effect can be obtained or supported by a radial peeling spring provided in the vicinity of the screw driver blade.

It is preferable that the inner debris suction section 7 comprise a moveable shield member 26 surrounding the actuation member 15 at least during operation of the actuation member 15, and a suction tube 29 being connected to the shield member 26. Such a shield member 26 facilitates maintaining a sufficient level of low pressure around the machine element 4 during the whole mounting process. A good air and particle suction result is thereby obtained. It is preferred that the cross-section of the shield member 26 and of the suction tube 29 provide a passage for a dismounted machine element 4. This facilitates sucking air from the vicinity of the machine element 4 during the dismounting process and, at the same time, sucking the dismounted machine element 4 away from the work piece 3.

The outer debris and air suction section 8 can be positioned towards a clamping position of the machine element 4 in the feeding section 6. Such a design permits providing at least one cleaning step before mounting the machine element 4 to the work piece 3. This improves the cleanness of the environment at a later mounting step of the machine element 4. Starting from such a design, it is preferable that the feeding section 6 comprises a movable feeding tube 20 being connected to a machine element conveyor. The machine element conveyor may then comprise a dispensing magazine, or a vibratory unit for singling out one machine element 4, and an air pressure feeder for transporting the machine element 4 to the clamping section.

By combining the air pressure feeder with the outer debris and air suction section 8 at an intermediate clamping position of the machine element 4 in the feeding section 6, a safe, clean and faultless supply of machine elements 4 is made possible. The moving air surrounding the machine element 4 during the transport from a stack or from a reservoir to the intermediate clamping position removes loose particles from its surface. These particles do not need to be removed at a later mounting step of the machine element 4.

Cleanliness of the mounting process may be further improved by arranging a shutter 23 between the feeding section 6 and the actuation section 5. In a closed position, the shutter 23 prevents passage of air from the feeding section 6 to the actuation section 5. In an open position, such passage of air and passage of the machine element 4 and the movable actuation of the actuation section 5 is made possible. Such a shutter 23 prevents moving and possibly dirty air transporting the machine element 4 to the intermediate clamping position from entering into inner sections of the clean room.

According to yet another aspect of the present invention, a clean room is provided for mounting at least one machine element 4 to at least one work piece 3 provided with one or more handling and actuation systems comprising one or more of the aforementioned features of the invention.

The invention also includes a use of such a clean room for manufacturing work pieces 3, e.g. for manufacturing hard disk drives usable in computers or for medicine technology equipment. It is emphasized that the proposed feeder can be used outside the field of screw feeding. The invention applies to all environments where mechanical parts or machine elements 4 as screws, bolts or other means for fastening at least two mechanical parts together have to be fed to a particular position under clean conditions.

Thus, the embodiments described herein are very effective at reducing contamination typical of pneumatically controlled feeders of mechanical parts, especially for screw feeders. For instance, particles created by tapping screws are removed before they can enter the clean room. Because any emitted particles are captured, they do not impair the clean room conditions and the consequent work result. The quality of the screwing process is thus improved.

A complete screwing cycle can advantageously be performed with one single apparatus under clean room conditions. Such a screwing cycle may comprise the sub-processes of feeding the screw, screwing the screw into the work piece 3, removing the screw, reworking the screw thread, and retracting the screw driver blade.

FIGS. 1 to 3 show a preferred embodiment of the present invention.

FIG. 1 is a side view showing the overall constitution of a handling and actuation system 1 according to a preferred embodiment of the present invention.

To provide a context for the present description, the handling and actuation system 1 is shown located at a partially displayed clean room 2, in which a work piece 3 is to be provided with a machine element 4. As shown, the work piece 3 is a computer hard disk drive (HDD) 3 that is to be provided with a screw 4. To aid the reader in understanding the handling and actuation system 1, the remaining discussion shall be described in the context of mounting a screw 4 to a HDD 3.

As shown in FIG. 1, the handling and actuation system 1 is divided into an actuation section 5 for mounting screw 4 to the HDD 3, a feeding section 6 for feeding screw 4 to the actuation section 5 into an inner debris suction section 7 being arranged as a part of the actuation section 5, and into an outer debris and air suction section 8 being arranged as a part of the feeding section 6. The feeding section 6 can be best seen in FIG. 3.

Referring to FIG. 3, feeding section 6 comprises a mouth piece body 9 in the form of a partially cut out tube, on the right side of which a fixing piece 10 is coupled. The fixing piece 10 comprises a groove 11 which is secured by a fastening block 12 with a fastening screw 13. Mouth piece body 9 further comprises a central opening 14 for guiding a screw driver blade 15 being movable along its longitudinal axis and being rotatable around its longitudinal axis by an actuator system (not shown).

The mouth piece body 9 is further provided with a fixing bracket 16 for rotatably guiding a supply bow 17. The supply bow 17 rotates around a rotation axis defined by a bolt 18 in the fixing bracket 16. The supply bow 17 comprises a supply channel 19 communicating with central opening 14 when the supply bow 17 contacts the mouth piece body 9 as shown in FIG. 3. A supply hose 20 is fitted to the outer end of the supply bow 17, the supply hose 20 being connected to a vibration conveyor (not shown) and to a compressed air feeder (not shown).

On the left side of mouth piece body 9, outer debris and air suction section 8 comprises two radial holes 21 forming a ring nozzle and communicating with central opening 14 just before an outlet opening 22 of central opening 14. The holes 21 are connected to an air suction and debris collection device (not shown).

A movable cover plate 23 is provided as a shutter for selectably closing a passage from feeding section 6 to actuation section 5.

As can be best seen in FIG. 2, actuation section 5 and inner debris suction section 7 are integrated into one functional unit in this exemplary embodiment of the invention.

A guiding piece 24 is provided for guiding an inner tube 25, which receives the screw driver blade 15. Inner tube 25 is positioned inside a shield 26, the shield 26 being movable along its longitudinal axis. For limiting the movement of shield 26, a leading bolt 27 guided in a leading groove 28 is provided in the guiding piece 24. A movement of shield 26 towards guiding piece 24 compresses a retraction spring 30. Shield 26 is further provided with a suction tube 29 communicating with the inside of shield 26. A suction apparatus (not shown) is connected to suction tube 29.

Further, in the inside of shield 26 located at the left side of FIG. 2, a radial peeling spring 30 is provided.

Next, the operation of the operating apparatus for a clean room arranged as described above will be set forth.

The vibration conveyor first singles out a screw 4. Screw 4 is then conveyed using compressed air through supply hose 20. In this state, the screw driver blade 15 is completely retracted as shown in FIG. 3 and the screw driver blade 15 gives way for passing screw 4 to mouth piece body 9. In the region of the outlet opening 22, screw 4 is caught by a securing spring (not shown). The securing spring adjusts and orientates screw 4 for later handling steps. During the aforementioned transport steps, screw 4 is cleaned by an air stream surrounding it. The air stream is maintained by compressed air coming from supply hose 20 and by the suction applied at holes 21. Passage to actuation section 6 is closed by covering plate 23.

In a subsequent process step, supply bow 17 is opened along movement arrow 31 and covering plate 23 is moved to a position opening passage to actuation section 5. Screw driver blade 15 is then advanced into outlet opening 22. Screw driver blade 15 performs a rotational movement such that it joins with a head of screw 4. Screw 4 is thereby advanced with a predefined force against a prepositioned drilling template in HDD 3, which can be best seen in FIG. 1.

At the same time, the suction apparatus maintains a suction at suction tube 29. Any particles arising from the screwing process are captured by the suction, thereby avoiding emission of the particles into the clean room or onto the work piece.

All screwing parameters are detected during the screwing process. If screw 4 fits properly in HDD 3, screw driver blade 15 is retracted to its starting position. At the same time, suction apparatus maintains a suction at suction tube 29. Any particles arising from the retraction process are captured by the suction. After terminating this process, either the entire handling and actuation system 1 or only shield 26 with actuation section 5 is retracted from HDD 3. The handling and actuation system 1 and/or HDD 3 can be repositioned and the process can be repeated for coupling another screw 4 to the HDD 3.

If screw 4 does not fit properly in HDD 3, e.g. because the thread of screw 4 or receiving aperture of HDD 3 is bad, screw 4 will be driven out of HDD 3. Guiding tube 25 is then retracted and the screw driver blade 15 together with screw 4 are retracted. Peeling spring 30 contacts and prevents screw 4 from being retracted into guiding tube 25 by stripping screw 4 from screw driver blade 15. Screw 4 is then sucked into suction tube 29 for disposal. Emission of any particles arising from the retraction process is avoided.

After terminating this process, either the entire handling and actuation system 1 or only shield 26 with actuation section 5 is retracted from HDD 3.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A handling and actuation apparatus, comprising:
    an actuation section for mounting a machine element to a work piece;
    a movable actuation member positioned in the vicinity of the actuation section, wherein the actuation member comprises a portion selected from a group consisting of a screw driver blade, a socket, and a pincer;
    a feeding section for feeding the machine element to the actuation section;
    an inner debris suction section positioned in the vicinity of the actuation section, the inner debris suction section sucking air from the vicinity of the actuation member at least during operation of the actuation member; and
    an outer debris and air suction section positioned in the vicinity of the feeding section, the outer debris suction section sucking air from the vicinity of the machine element during feeding of the machine element.

2. The apparatus as recited in claim 1, wherein the actuation section is capable of dismounting a machine element mounted to the work piece.

3. The apparatus as recited in claim 2, wherein air is sucked from a vicinity of the machine element during the dismounting of the machine element by the inner debris suction section.

4. The apparatus as recited in claim 2, wherein the dismounted machine element is captured by suction of the inner debris suction section.

5. The apparatus as recited in claim 2, wherein the actuation member extends through a guide tube, the guide tube being positionable along a longitudinal axis of the actuation member.

6. The apparatus as recited in claim 1, further comprising a relocation mechanism for selectably positioning the actuation member along a longitudinal axis of the actuation member.

7. The apparatus as recited in claim 1, wherein the actuation section is positioned at least partially in a clean room.

8. The apparatus as recited in claim 1, wherein the outer debris and air suction section is positioned towards a clamping position of the machine element in the feeding section.

9. The apparatus as recited in claim 1, wherein the feeding section further comprises a feeding tube being coupled to a machine element conveyor, the machine element conveyor comprising an air pressure feeder for transporting the machine element to a clamping section.

10. The apparatus as recited in claim 9, wherein the machine element conveyor comprises a vibratory unit for singling out one machine element.

11. A handling and actuation apparatus, comprising;
    an actuation section for mounting a machine element to a work piece;
    a movable actuation member positioned in the vicinity of the actuation section;
    a feeding section for feeding the machine element to the actuation section, an inner debris suction section positioned in the vicinity of the actuation section, the inner debris suction section sucking air from the vicinity of the actuation member at least during operation of the actuation member; and an outer debris suction section sucking air from the vicinity of section, the outer debris and air suction section positioned in the vicinity of the feeding the machine element during feeding of the machine element, wherein the inner debris suction section further comprises a movable shield member surrounding the actuation member, and a suction tube being connected to the shield member.

12. The apparatus as recited in claim 11, wherein the machine element passes through the shield member.

13. A handling and actuation apparatus, comprising; an actuation section for mounting a machine element to a work piece; a movable actuation member positioned in the vicinity of the actuation section;

a feeding section for feeding the machine element to the actuation section;

an inner debris suction section positioned in the vicinity of the actuation section, the inner debris suction section sucking air from the vicinity of the actuation member at least during operation of the actuation member;

an outer debris and air suction section positioned in the vicinity of the feeding section, the outer debris suction section sucking air from the vicinity of the machine element during feeding of the machine element; and a shutter positioned between the feeding section and the actuation section, the shutter being movable between a closed position in which passage of air from the feeding section to the actuation section is substantially prevented and an open position in which passage of air from the feeding section to the actuation section is permitted.

14. A handling and actuation apparatus, comprisng:

an actuation section for mounting a machine element to a work piece;

a movable actuation member positioned in the vicinity of the actuation section;

a feeding section for feeding the machine element to the actuation section, an inner debris suction section positioned in the vicinity of the actuation section; the inner debris suction section sucking air from the vicinity of the actuation member at least during operation of the actuation member; and an outer debris and air suction section positioned in the vicinity of the feeding section, the outer debris suction section sucking air from the vicinity of the machine element during feeding of the machine element, wherein the feeding section further comprises a feeding tube being coupled to a machine element conveyor, the machine element conveyor comprising an air pressure feeder for transporting the machine element to a clamping section.

15. The apparatus as recited in claim 14, wherein the actuation section is capable of dismounting a machine element mounted to the work piece.

16. The apparatus as recited in claim 15, wherein air is sucked from a vicinity of the machine element during the dismounting of the machine element by the inner debris suction section.

17. The apparatus as recited in claim 15, wherein the dismounted machine element is captured by suction of the inner debris suction section, 18. The apparatus as recited in claim 15, wherein the actuation member extends through a guide tube, the guide tube being positionable along a longitudinal axis of the actuation member.

19. The apparatus as recited in claim 14, further comprising a relocation mechanism for selectably positioning the actuation member along a longitudinal axis of the actuation member.

20. The apparatus as recited in claim 19, wherein the actuation member comprises a screw driver blade.

21. The apparatus as recited in claim 14, wherein the inner debris suction section further comprises a moveable shield member surrounding the actuation member, and a suction tube being connected to the shield member.

22. The apparatus as recited in claim 21, wherein the machine element passes through the shield member.

23. The apparatus as recited in claim 14, wherein the outer debris air suction section is positioned towards a clamping position of the machine element in the feeding section.

24. The apparatus as recited in claim 14, wherein the actuation section is positioned at least partially in a clean room.

25. The apparatus as recited in claim 24, wherein the machine element conveyor comprises a vibratory unit for singling out one machine element.

26. The apparatus as recited in claim 14, further comprising a shutter positioned between the feeding section and the actuation section, the shutter being movable between a closed position in which passage of air from the feeding section to the actuation section is substantially prevented and an open position in which passage of air from the feeding section to the actuation section is permitted.

27. A handling and actuation apparatus, comprising:

an actuation section for mounting a machine element to a work piece;

a movable actuation member positioned in the vicinity of the actuation section, wherein the actuation member comprises a portion selected from a group consisting of a screw driver blade, a socket, and a pincer;

a feeding section for feeding the machine element to the actuation section; and an inner debris suction section positioned in the vicinity of the actuation section, the inner debris suction section sucking air from the vicinity of the actuation member at least during operation of the actuation member.

* * * * *